United States Patent [19]

Tanaka et al.

[11] Patent Number: 4,786,999
[45] Date of Patent: Nov. 22, 1988

[54] TRANSDUCER SUSPENSION MOUNT APPARATUS

[75] Inventors: Kihachiro Tanaka, Ushiku; Taichi Sato; Shuji Onodera, both of Ibaraki; Yokuo Saitoh, Kanagawa; Hiroshi Daito, Odawara; Yoko Murata, Ibaraki; Shigeo Hara, Minamiashigara; Shoichi Setone, Ebina, all of Japan

[73] Assignee: Hitachi, Ltd., Tokyo, Japan

[21] Appl. No.: 5,075

[22] Filed: Jan. 20, 1987

[30] Foreign Application Priority Data

Jan. 20, 1986 [JP] Japan ................................. 61-7924

[51] Int. Cl.[4] ............................................... G11B 5/49
[52] U.S. Cl. ................................................. 360/104
[58] Field of Search ............ 360/104, 105, 106, 97–99, 360/102, 103

[56] References Cited

U.S. PATENT DOCUMENTS

| 4,167,765 | 9/1979 | Watrous | 360/103 |
| 4,189,759 | 2/1980 | Bauck et al. | 360/104 |
| 4,443,824 | 4/1984 | Frater et al. | 360/104 |
| 4,520,555 | 6/1985 | Gyi et al. | 360/104 |
| 4,535,374 | 8/1985 | Anderson et al. | 360/104 |

FOREIGN PATENT DOCUMENTS

57-109124  7/1982  Japan ................................. 360/104

Primary Examiner—John H. Wolff
Assistant Examiner—Matthew J. Bussan
Attorney, Agent, or Firm—Antonelli, Terry & Wands

[57] ABSTRACT

A suspension mount apparatus for a transducer used in a magnetic memory for recording and reproduction, is characterized in that the points, at which a rigid arm and a magnetic head/arm assembly supported by the rigid arm are connected to each other, are provided within a region in which the rigidity of the connecting points vary at constant rates with respect to the distances between the connecting points and the borderlines between the rigid arm and the assembly.

18 Claims, 9 Drawing Sheets

TRANSDUCER SUSPENSION MOUNT APPARATUS

FIELD OF THE INVENTION

The present invention relates to a suspension mount apparatus for a transducer used in a magnetic memory for recording and reproduction, and more particularly to a suspension mount apparatus for an air-bearing transducer.

BACKGROUND OF THE INVENTION

Among various types of data memory, magnetic disk units in which data is written onto or reproduced from the surface of a rotating recording disk by means of a magnetic head are particularly widely used. In a magneti disk unit, it is known to use a transducer suspension mount apparatus in which a rigid arm supports thereon in a cantilevered fashion one end of a magnetic head/-arm assembly which supports a transducer so as to locate the latter at a target track selected from a plurality of concentric data-written tracks on the surface of the recording disk and thus to allow reading and writing with respect to the selected track. It is also well-known that, when the recording disk is rotated with the transducer pressed against the disk, the transducer floats above the surface of the recording disk by a certain spacing amount on the order of a submicron below 0.5 μm. Therefore, in order to ensure that the transducer follows the movements of the recording disk surface with a fixed gap between the two, it has to be supported with a sufficient degree of elasticity in the direction of the gap, as well as in the directions of the pitching and rolling movements thereof. At the same time, however, the support has to be such that it ensures a sufficiently high degree of rigidity in the direction of the running of the disk surface, as well as in the accessing and yawing directions of the transducer.

In order to satisfy the above requirements, the prior art includes, for example, the transducer suspension mount apparatus disclosed in the specification of U.S. Pat. No. 4,167,765.

With the recent rapid increase in the capacity of magnetic disk units, it has increasingly been required to improve the degree of precision with which the transducer is supported above the tracks on a recording disk, and also to stably maintain the gap between the transducer and the recording disk. However, conventional transducer suspension mount apparatus encounter difficulties in satisfying these additional requirements. In general, a transducer suspension mount apparatus which includes the transducer itself is caused to vibrate by external vibrational forces such as complicated vibrations of the recording disk being rotated or wind caused by the rotation of the recording disk. However, if a transducer suspension mount apparatus has such a structure that, as in the prior art, the corresponding magnetic head/arm assembly is connected to the corresponding rigid arm by a suitable method such as screwing, welding, or clamping only at a substantially central portion of the entire area over which the assembly is brought into contact with the rigid arm and is fixed thereto, an apparatus having such structure is not able to cope with vibrations caused by torsion in the magnetic head/arm assembly to a sufficient extent, thus resulting in the problem that the transducer experiences an increased level of vibration. Further, such high level of torsion vibration may lead to flapping of the assembly and the rigid arm, thus resulting in variations in the degree of vibration between a plurality of transducer suspension mount apparatus.

Consequently, it is difficult to satisfy the above requirements with the conventional apparatus.

SUMMARY OF THE INVENTION

An object of the present invention is to provide a transducer suspension mount apparatus which is capable of offering a high degree of precision in determining the position of the transducer above the recording disk as well as of ensuring with ease stable maintenance of the gap between the transducer and the recording disk.

In order to achieve the above object, in a transducer suspension mount apparatus in accordance with the present invention, points at which a magnetic head/arm assembly of the apparatus is connected to a rigid arm of the same are provided in the vicinity of both ends of the borderline between the assembly and the rigid arm on the side close to the transducer. More specifically, the assembly and the rigid arm are brought into contact with each other at an overlapping mounting portion, and each of the points at which they are connected to each other are located in the area over which the assembly and the rigid arm are in contact with each other and within a region thereof within which the rigidity of the connecting point varies at a constant rate with respect to the distances from the borderlines between the rigid arm and the assembly.

The foregoing and other features, objects, and advantages of the present invention will be clearly understood from the following description when read in connection with the accompanying drawings.

DESCRIPTION OF THE ILLUSTRATED EMBODIMENTS

Embodiments of the present invention will now be described with reference to the drawings.

Figure 1:
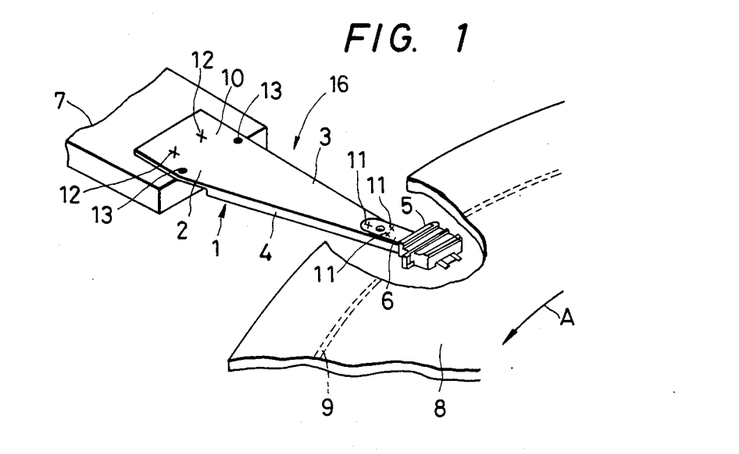
FIG. 1 is a perspective view of a transducer suspension mount apparatus in accordance with a first embodiment of the present invention.

FIG. 1 is a perspective view showing a transducer suspension mount apparatus in accordance with a first embodiment of the invention, and more particularly the manner in which the apparatus floats above a magnetic recording disk being rotated, with a magnetic head/arm assembly 16 of the apparatus being fixed to a rigid arm 7 of the same. A transducer 5 is adapted to perform reading and writing of data from and into tracks 9 on the surface of a recording disk 8 which rotates in the direction indicated by the arrow A in the figure, and is supported by a transducer supporting arm 1 via a flexure 6. The root side of the transducer supporting arm 1, i.e. the side thereof remote from the side on which the transducer is mounted, is connected to the rigid arm 7. The rigid arm 7 is connected on the other side thereof to an operation system (not shown). The transducer 5 is caused by means of the operation system to access one of the tracks 9 on the surface of the recording disk 8 which is arbitrarily selected. When this access is completed with the transducer having thus been brought into a position above the target track 9, a closed-loop servo system or the like is used in order to precisely locate the transducer 5 above the track 9.

The above-described transducer supporting arm 1 comprises an elastic spring portion 2, a triangular and elongated flat portion 3, a flange 4, and a portion 10 at which the arm 1 is mounted onto the rigid arm 7. The elastic spring portion 2 has two major functions. One of them is to apply an amount of load which is necessary for spacing the transducer 5 from the recording disk 8 by a predetermined spacing amount. That is, in a condition wherein the transducer 5 is spaced from the disk in such a manner as to float above the disk, the load applied by the elastic spring portion 2 acts against the air-supporting force supplied by the flow of air between the transducer 5 and the recording disk 8. The other function is to stably support the transducer 5 while preventing any restriction of its vertical movement so as to allow the same to follow the vibration and other movements of the surface of the disk 8 to a sufficient extent. The flange 4 is composed as a bent structure forming part of the flat portion 3, thereby increasing the degree of rigidity of the transducer supporting arm 1.

The above flexure 6 is mounted on the transducer supporting arm 1 in such a manner as to be fixed by a connecting means 11 which may be welded, thereby supporting the transducer 5. The magnetic head/arm assembly 16 is constituted by the transducer supporting arm 1, the flexure 6, and the transducer 5. The flexure 6 has a pivot or load protuberance (not shown), and the load applied by the elastic spring portion 2 is transmitted to the transducer 5 through the point of this pivot. That is, the transducer 5 is composed as an air-bearing which is pivotally supported. The flexure 6 is very flexible with respect to the movements of the transducer 5 around the pivot point in the pitching direction and the rolling direction, i.e. the rotations of the transducer 5 respectively around the axis in the direction of the radius of the disk 8 and around the axis in the circumferential direction of the disk 8, as viewed in FIG. 1. In this way, the flexure 6 is provided with sufficient ability to follow undulations as the recording disk 8 rotates. In addition, the flexure 6 acts to insulate any external vibration which otherwise would be transmitted from the transducer supporting arm 1 to the transducer 5.

The connection of the transducer supporting arm 1 to the rigid arm 7 is provided by the mounting portion 10 of the transducer supporting arm 1. The entire surface of the mounting portion 10 of the supporting arm 1 is brought into contact with the rigid arm 7, and firm connection therebetween is provided by a connection means 12 which may be formed by welding a substantially central portion of the area of contact between the portion 10 and the rigid arm 7, or by a clamp. With this connecting method, however, since the connection means is provided only in the vicinity of the center of the entire contact area, when the transducer supporting arm 1 vibrates due to external forces such as wind caused by the rotation of the recording disk 8 at high speed, gaps will be formed between the mounting portion 10 and the rigid arm 7, thus leading to a flapping phenomenon.

In this embodiment, further connecting points 13 are provided, in addition to the above connection means 12, in the contact area on the side closer to the transducer 5, more specifically, in the vicinity of both ends of the borderline adjacent to the elastic spring portion 2. These further connecting points 13 may be formed by, for instance, welded portions.

Figure 2:
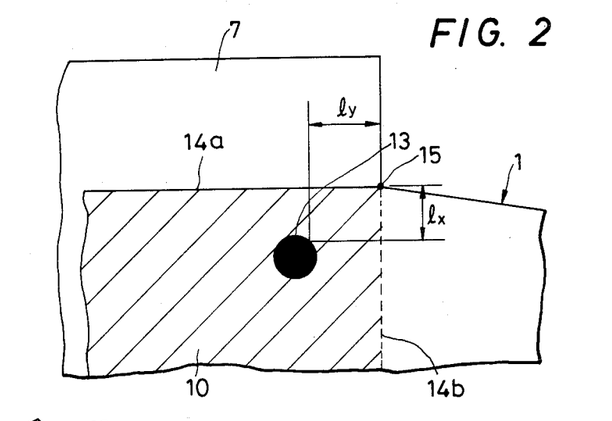
FIG. 2 is a view showing the essential parts of the apparatus shown in FIG. 1 drawn to an enlarged scale.

FIG. 2 shows the periphery of one of the connecting points 13 shown in FIG. 1, drawn to an enlarged scale. In FIG. 2, the portion 10 at which the transducer supporting arm 1 is mounted to the rigid arm 7, in other words, the contact area therebetween, is indicated by hatching. Also in FIG. 2, the distances from the connecting point 13 to the borderline 14a of the mounting portion 10 of the head/arm assembly 16 and to the borderline 14b of the same are respectively defined as the distances lx and ly. These distances lx and ly indicate the respective minimum values of the transverse and longitudinal distances from the crosspoint 15 of the borderlines to the connecting point 13.

Next, explanation will be made concerning the positions at which each of the connecting points 13 must be provided for the purpose of restricting the vibrations of the transducer.

It is a known fact that a transducer suspension mount apparatus such as that shown in FIG. 1 has a complicated vibration mode. The vibration mode of the illustrated apparatus includes torsion vibration mode and bending vibration mode.

Figure 3:
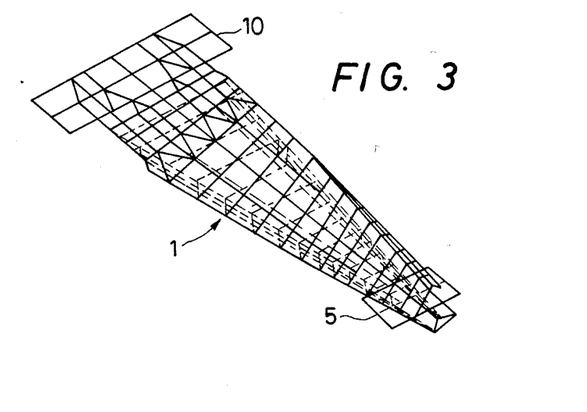
FIG. 3 is a view showing the mode of torsion vibration in the apparatus.

FIG. 3 shows the torsion vibration mode in the apparatus. The solid lines in the drawing show the configuration of the transducer suspension mount apparatus which is varied in this way after the apparatus experiences torsion vibration. As will be seen from the drawing, the transducer supporting arm 1 becomes twisted to a significant extent. As the arm 1 becomes twisted, the root ends of the arm 1 are caused to vibrate vertically, and the amount of this vertical vibration at these root ends are larger than corresponding amounts at the other points on the borderline. It will thus be appreciated that the most effective way to reduce the torsion vibration is to connect the arm 1 to the rigid arm 7 at the root ends of the arm 1.

Figure 4:
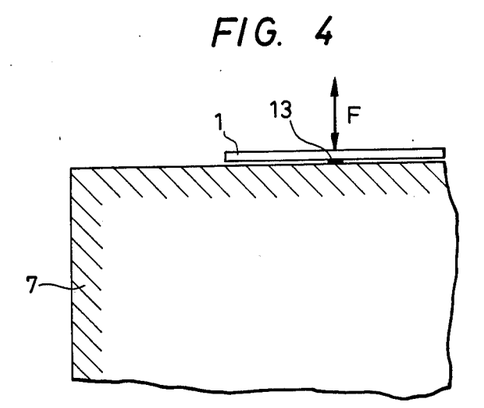
FIG. 4 is a view showing the state of the connecting point being acted upon by force.
Figure 5:
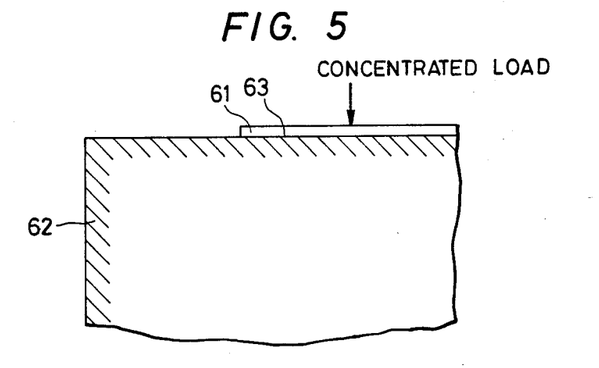
FIG. 5 is a view showing a model after the state shown in FIG. 4.

However, when the spot welding of the connecting points 13 is performed at positions which are very close to either ends of the borderline, the influence by the spot welding at substantial ends of the borderline with respect to the rigidity has to be given due consideration. When examining the strength of the spot welding connection of the transducer supporting arm 1 to the rigid arm 7, it will be clear that, when the head/arm assembly is subjected to torsion vibration, a tensile or compression force F such as that shown in FIG. 4 acts on the spot-welded point, and that the rigid arm 7 has a considerable thickness relative to the thickness of the transducer supporting arm 1. Thus, it will be appreciated that the matter can be best studied in terms of a phenomenon whereby a concentrated load acts upon the surface of a two layered elastic body, as exemplified in FIG. 5. In FIG. 5, since the presence of a border layer 63 between an elastic body 61 and the other elastic body 62 may be ignored when considering the stress distribution in the elastic bodies 61 and 62, this problem of the stress distribution can be studied by using a model such as that shown in FIG. 6 in which a concentrated load P acts upon a two-dimensional elastic body.

Figure 6:
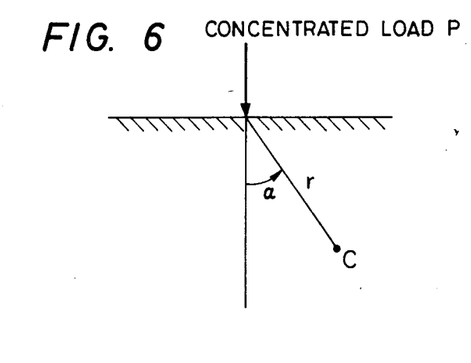
FIG. 6 is a view showing a state in which a two-dimensional elastic body is acted upon by concentrated load P.

In FIG. 6, the stress acting at a point C can be expressed by the following equations:

$$\sigma r = \frac{2P}{\pi} \times \frac{\cos\alpha}{r} \quad (1)$$

$$\sigma\alpha = \tau r\alpha = 0$$

Figure 7:
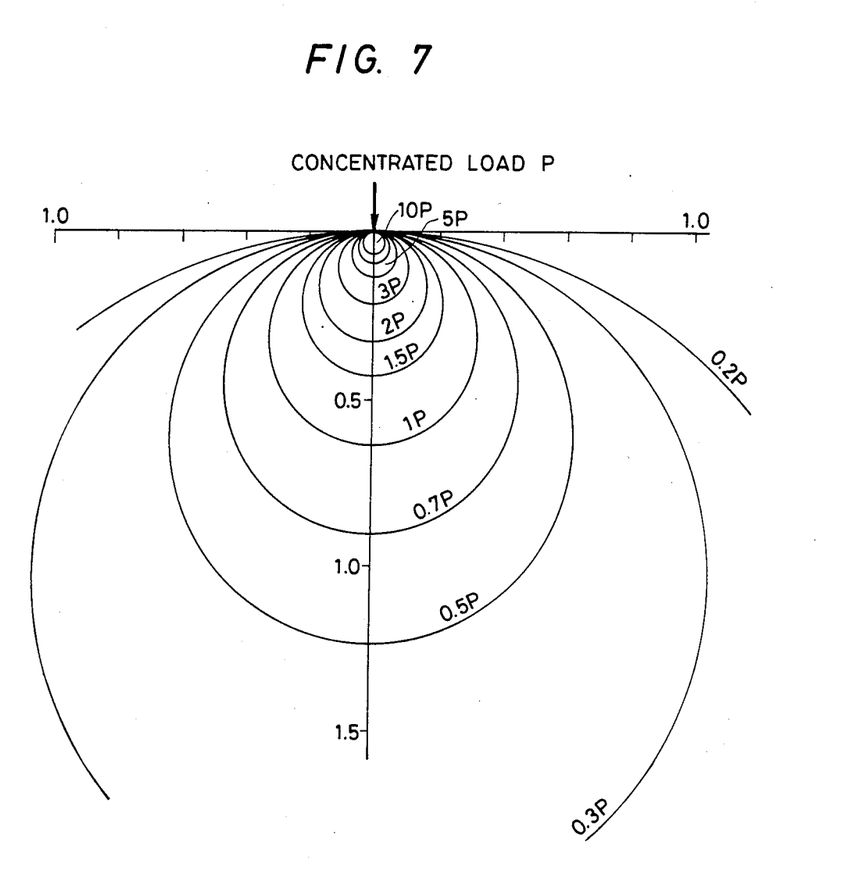
FIGS. 7, 8, 9, and 10 are views showing isolines of stress distribution.
Figure 8:
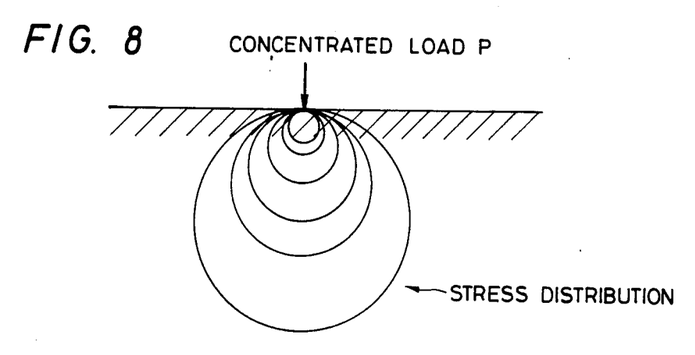
Figure 9:
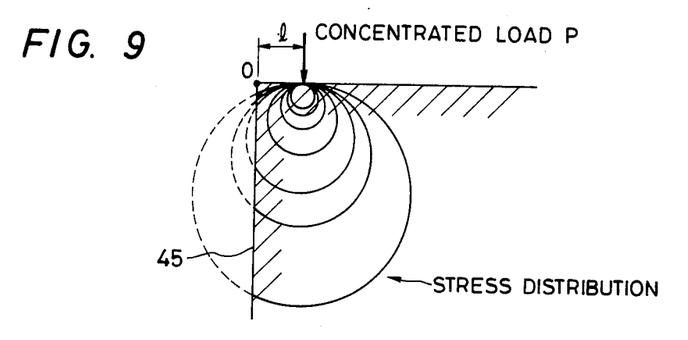

The isolines of the stress factor $\sigma r$ are shown by the concurrence of circles as shown in FIG. 7. The isolines of the stress factor $\sigma r$ show a distribution pattern such as that shown in FIG. 8 when there is no border and accordingly no influence is brought about thereby, while the lack of stress which is the part indicated by broken lines in FIG. 9 must be considered when there is a border in the elastic body and, hence, some influence is brought about thereby. As will be seen from FIGS. 8 and 9, when the elastic body extends without limit, the stress distribution has its center formed by the loadacting point and is axisymmetric, as shown in FIG. 8, while when the elastic body has a border 45 and when the loadacting point is in the vicinity of the border, part of the stress distribution (the part indicated by broken lines in FIG. 9) has no substance to act upon. As a result, the stress indicated by the broken lines is borne by the elastic body, and consequently, the deformation experienced by the elastic body in the case of FIG. 9 is larger than that experienced by the elastic body shown in FIG. 8. That is, when there is a border in an elastic body and when load acts thereon in the vicinity of the border, the rigidity of the body becomes lower than the rigidity of an elastic body with no border. Thus, considering the fact that the degree of rigidity is closely related to the stress distribution, the variation in rigidity may be expressed by an indicator as is hereinafter described.

Figure 10:
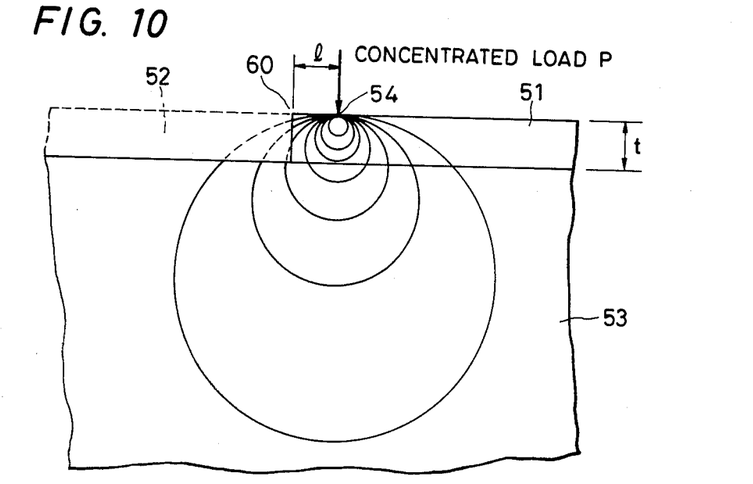

An exemplary two-dimensional elastic body is divided into three regions, as shown in FIG. 10. Comparing this with the transducer suspension mount apparatus of the invention, a region 51 corresponds to the mounting portion 10 of the transducer supporting arm 1, the region 53 corresponds to the rigid arm 7, and a point 54 at which concentrated load P acts corresponds to the connecting point 13. A region 52 which is separated from the region 51 by a border 60 is a space imagined by extending the region 51.

When the length of each of the isoline-circles of the distribution of the stress $\sigma r$ in both the regions 51 and 52 is represented by a value lc, and also when the sum of the products of the length lc and the stress $\sigma r$ is represented by the symbol K, the sum K of these products can be expressed by the following equation:

$$K = \sum_i (\sigma r \times lc)i \quad (2)$$

wherein the symbol i represents an arbitrary number of isolines. When similar consideration is given also to the region 51 alone, by representing the length of each of the isoline-circles of the distribution of the stress $\sigma r$ in the region 51 alone by a symbol lc', the sum K' of the products of the length lc' and the stress $\sigma r$ can be expressed by the following equation:

$$K' = \sum_i (\sigma r \times lc') \quad (3)$$

wherein the symbol i represents an arbitrary number of isolines. Thus, the sum K' equals the difference obtained by subtracting from the sum K the sum of products between the length of each of the isoline-circles of the distribution of the stress $\sigma r$ in the void region 52 and the stress $\sigma r$. The value obtained by dividing the sum K' by the sum K is used as the indicator $K_{REF}$ which indicates the rate at which the rigidity of the connecting portion varies under the influence of the border.

When the distribution of any force acting upon the connecting point is not influenced by the presence of a border, the value of the indicator $K_{REF}$ will become 1 ($K_{REF}=1$) because the sums K and K' are equal to each other. Conversely, when a force acts on the connecting point at a position on the border (when the relationship $l=0$ stands in FIG. 10), the value of the indicator $K_{REF}$ will become 0.5. In this way, it is possible to indicate the rate at which the rigidity of the connecting point varies with respect to the distance from the borderline by using the indicator $K_{REF}$.

In this embodiment, the sum value K expressed by the equation (2) relates, for example, to thirteen isolinecircles of the distribution of the stress or in which $\sigma r$ is equal to 10P, 7P, 5P, 3P, 3P, 1.5P, 1P, 0.7P, 0.5P, 0.3P, 0.2P, 0.15P, or 0.1P.

Next, calculation of the value of the indicator $K_{REF}$ with respect to the transducer suspension mount apparatus of the invention will be explained. In this calculation, the variation rate of the rigidity of the connecting portion with respect to the distance lx (shown in FIG. 2) between the connecting point and the borderline, can be considered in the way illustrated in FIG. 10. Further, it can be considered that, since no portion of rigid arm 7 is present below the transducer supporting arm 1 on the side of the borderline 14b which is close to the transducer, only a small amount of stress is borne by this portion. Therefore, it is possible to consider that the variation rate of the rigidity with respect to the distance ly between the connecting point and the borderline 14b can be considered in the way shown in FIG. 9. Since the thickness of the mounting portion of the transducer supporting arm 1 of this type normally ranges from 50 to 100 μm, the value of indicator $K_{REF}$ with respect to the distances lx and ly is shown in FIGS. 11 and 12, respectively, provided that the mounting portion has a thickness within the above-mentioned range.

Figure 11:
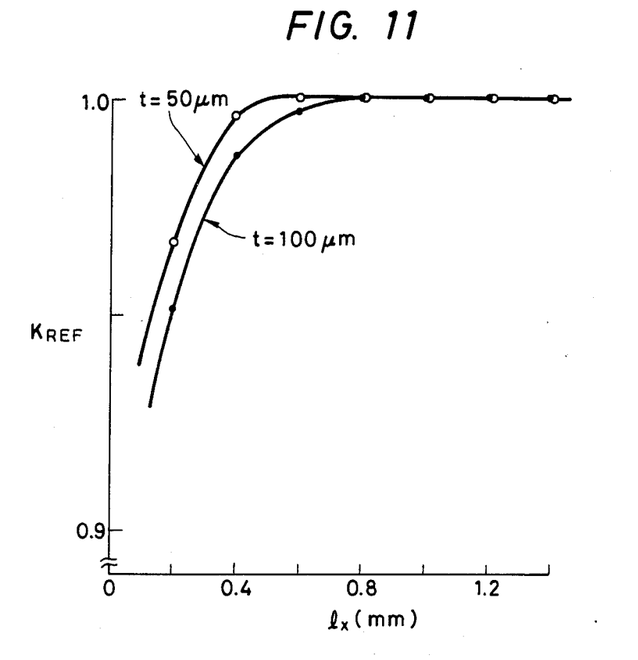
FIGS. 11 and 12 are graphs showing variations in rigidity in the apparatus shown in FIG. 1.
Figure 12:
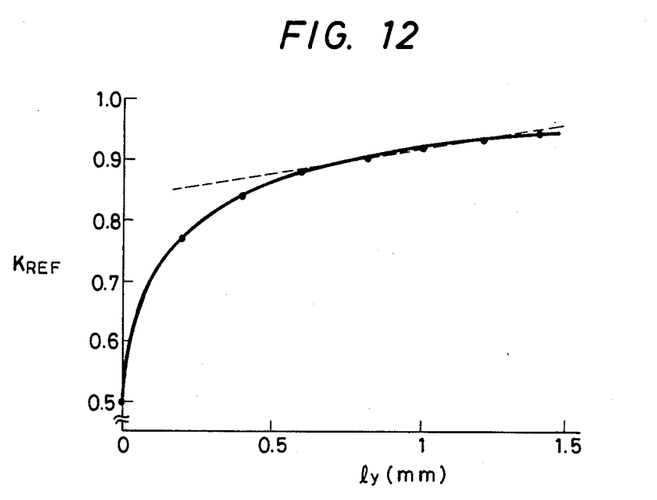
Figure 13:
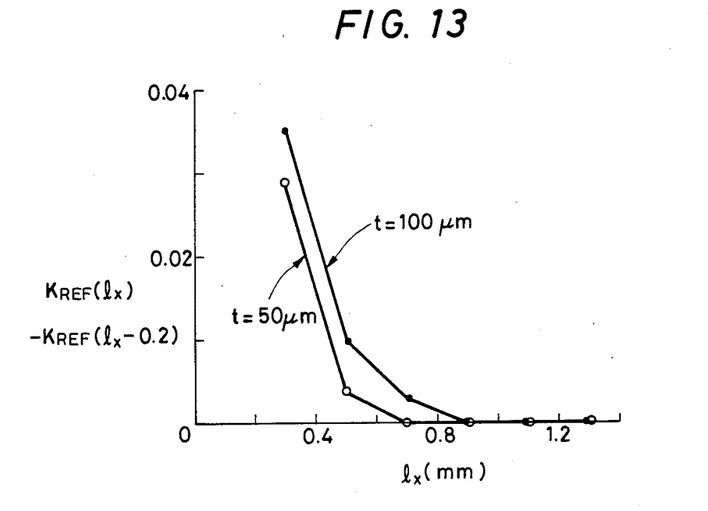
FIG. 13 is a graph showing the differential values of values shown in FIG. 11.
Figure 14:
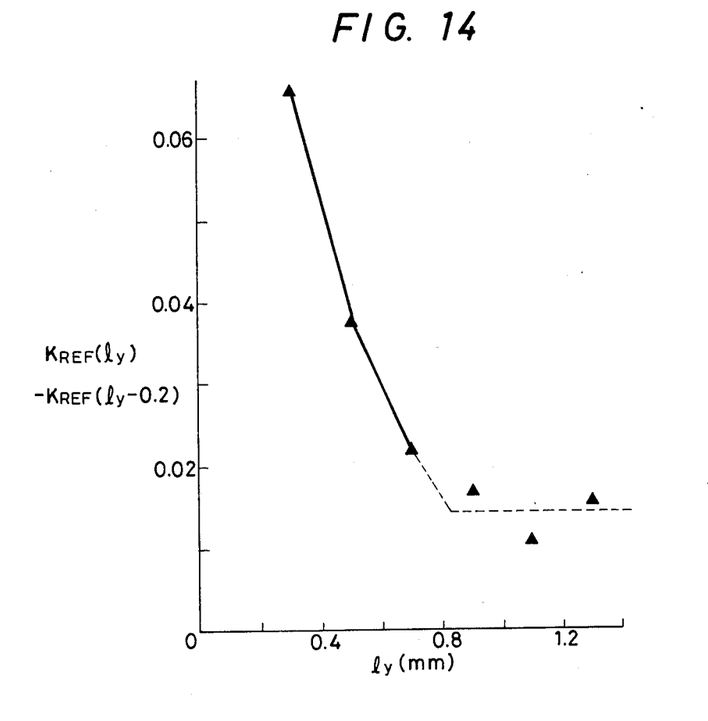
FIG. 14 is a graph showing the differential values of values shown in FIG. 12.

As will be clearly seen from the graphs of FIGS. 11 and 12, when the values of both the distances lx and ly are above 0.6 mm, the value of indicator $K_{REF}$ which indicates the variation rate of the rigidity becomes constant. In addition, FIGS. 13 and 14 respectively show the change in the value of the indicator $K_{REF}$ relative to the distance values lx and ly.

Figure 15:
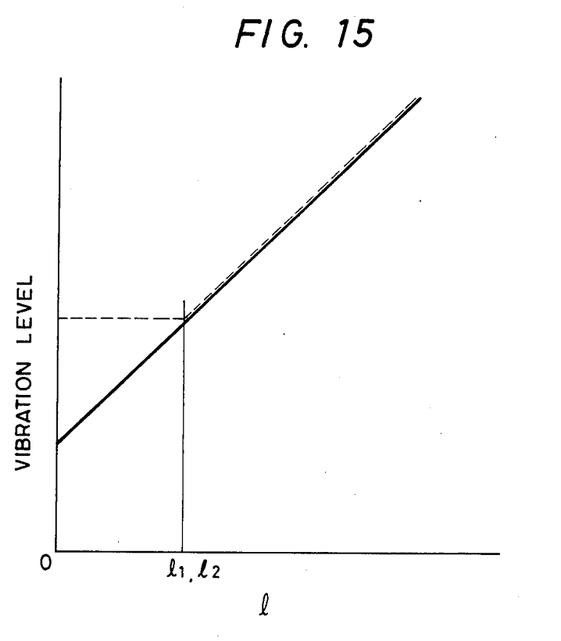
FIG. 15 is a graph showing the relationship between the level of vibration and the distance between a borderline and the connecting point.

If the presence of the borderlines had no influence on the value of the indicator $K_{REF}$, that is, if the value of the indicator $K_{REF}$ were constant irrespective of the value of the distance l, the level of vibration of the transducer would vary in substantial proportion to the values of the distance l. That is, the vibration level and the distance value would assume the linear relationship indicated by the solid line in FIG. 15. With the influence of the borderlines, however, the vibration level becomes greater than the value previously shown by the solid line to fail to establish a proportional relation, as indicated by the broken line in FIG. 15, within a range in which the value of the indicator falls outside a certain value. Therefore, in the illustrated transducer suspension mount apparatus, the level of vibration of the transducer can be restricted by connecting the head/arm assembly to the rigid arm within a region defined by the distances l1 and l2 from the borderlines.

Next, experimental data concerning the transducer suspension mount apparatus (shown in FIG. 1) in accordance with a first embodiment of the invention will be explained with reference to FIGS. 17 and 18.

Figure 16:
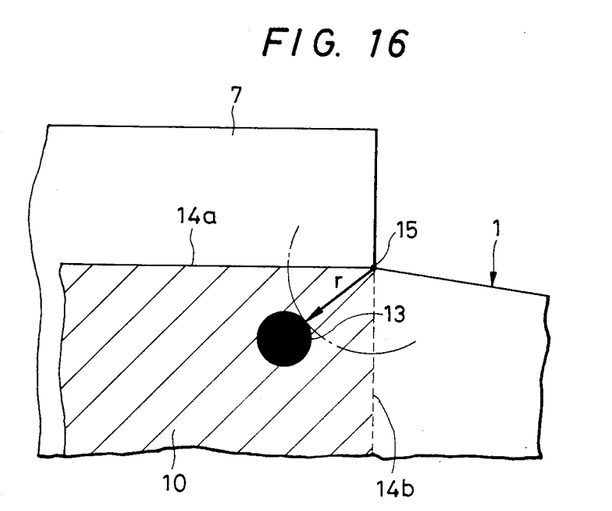
FIG. 16 is a view showing the essential parts of the apparatus shown in FIG. 1 drawn to an enlarged scale.

In the experiments, the radius r, which is the distance between the connecting point 13 and the cross-point 15 between the borderlines 14a and 14b, is adopted as a parameter as shown in FIG. 16. FIGS. 17 and 18 show the relationship between the radius r and the level of vibration of the transducer. More specifically, FIG. 17 show the amount of deviation of the transducer 5 from the track 9 on the surface of the recording disk 8 relative to the value of the radius r, that is, the head vibration in the radial direction of the disk relative to the same, while FIG. 18 shows the fluctuation in the spacing amount of the transducer 5 above the disk relative to the value of the radius r.

Figure 17:
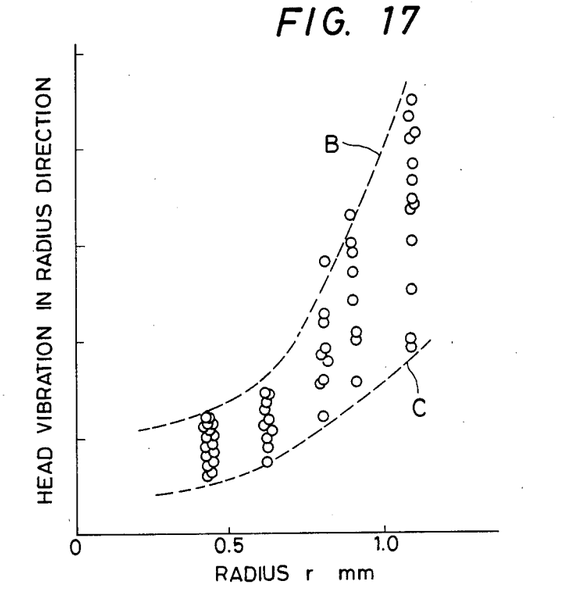
FIG. 17 is a graph showing the relationship between a point at which a magnetic head/arm assembly of the apparatus is connected to a rigid arm of the same and the level of head vibration in the radial direction.
Figure 18:
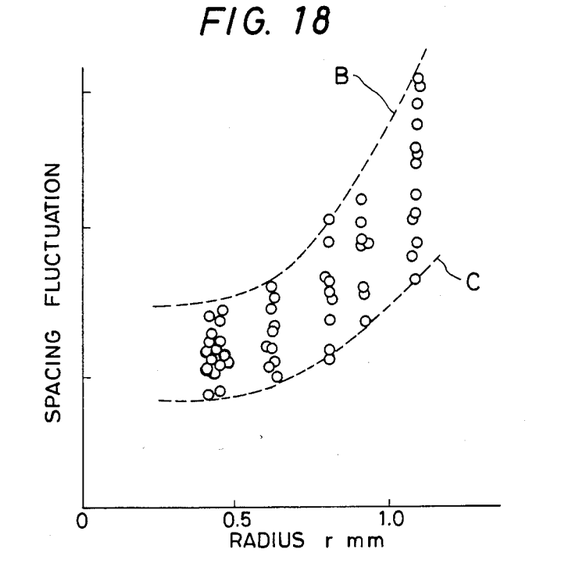
FIG. 18 is a graph showing the relationship between the point at which the assembly is connected to the rigid arm and the fluctuation in the spacing amount of the transducer.

Referring to FIG. 17, each circular mark indicates the data value of the head vibration in the radial direction experienced by the apparatus. It will be seen from the drawing that as the value of the radius r becomes smaller, the head variation data value in the radial direction also becomes smaller, with the distribution of the data value converging to a very narrow range. As will be seen from the smooth curves indicated by the broken lines B and C which respectively connect the maximum values and the minimum values of the data corresponding to radius values, within a region in which the value of the radius r is below 0.6 mm, the head variation in the radial direction relative to the change in the radius value sharply becomes smaller. This means that, within a region in which the radius is below 0.6 mm, the position of the transducer does not greatly vary. Next, referring to FIG. 18 which shows the fluctuation in the spacing amount of the transducer relative to the value of the radius r, it will be seen from the drawing that the spacing fluctuation exhibits substantially the same characteristics as those of the variation in the radial direction.

On the basis of the above-described experimental data and the graphs of FIGS. 11 and 12, each of the connecting points 13 is provided within a region in which the rigidity of the connecting portion varies at a constant rate, that is, a region in which the following equations are satisfied, thereby ensuring a highly precise control in determining the position of the transducer as well as maintenance of stable floating of the same above the disk which may be accomplished with ease.

$$0 \leq x \leq 0.6 \text{ (mm)}$$

$$0 \leq y \leq 0.6 \text{ (mm)}$$

Figure 19:
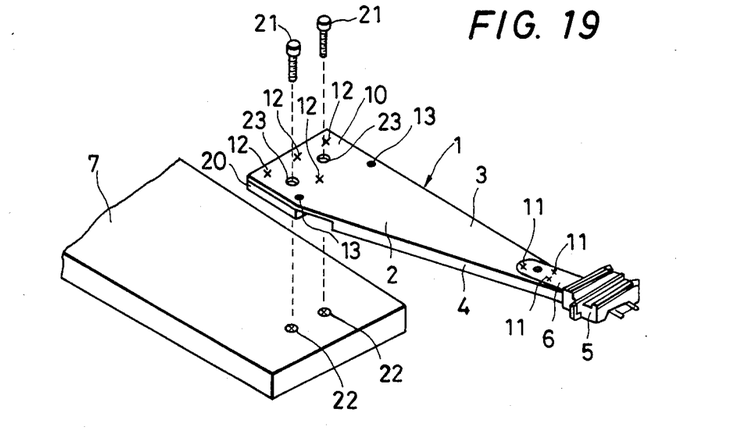
FIG. 19 is a perspective view used to explain a transducer suspension mount apparatus in accordance with a second embodiment of the invention, showing the apparatus before assembly.

A transducer suspension mount apparatus in accordance with a second embodiment of the invention will be described with reference to FIG. 19. In this embodiment, the mounting of a transducer supporting arm 1 to a rigid arm 7 is accomplished through the intermediary of a reinforcing plate 20. A mounting portion 10 of the transducer supporting arm 1 is connected to this reinforcing plate 20 by providing a connection means 12 which may be welded or clamped and by further providing connecting points 13 which may comprise welded portions at the root ends of the transducer supporting arm 1. The supporting arm 1 and the reinforcing plate 20 have holes 23 previously formed therein, while the rigid arm 7 has screw holes 22 corresponding to these holes 23. The transducer supporting arm 1 is fixed to the rigid arm 7 via the reinforcing plate 20 by means of screws 21, thus completing the assembly of the transducer suspension mount apparatus. The apparatus in accordance with the second embodiment has the same structure as that shown in FIG. 1 except for the above-described arrangement. According to this embodiment, because the root ends of the transducer supporting arm 1 is fixed to the reinforcing plate 20, which has a sufficient degree of rigidity, in a firm manner by employing spot welding, the apparatus is capable of offering a high degree of precision in determining the position of the transducer as well as of ensuring with ease a stable floating of the transducer above the disk, in the same way as in the first embodiment.

Figure 20:
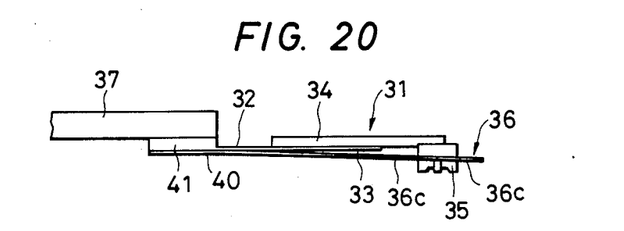
FIGS. 20 and 21 are views used to explain a third embodiment of the invention, FIG. 20 being a side view, and FIG. 21 being a plan view.
Figure 21:
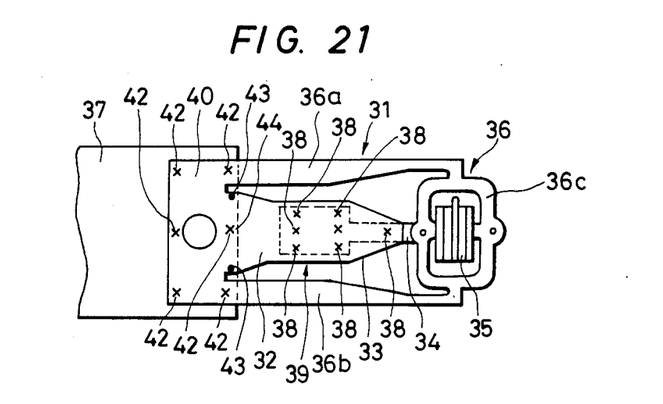

FIGS. 20 and 21 show a third embodiment of the present invention, FIG. 20 being a side view of the apparatus in accordance with the third embodiment, and FIG. 21 being a plan view of the same. In this embodiment, a magnetic head/arm assembly 31 comprises a spring member 33 having an elastic spring portion 32, pressurizing plate 34, a flexure 36, and a transducer 35. This magnetic head/arm assembly 31 is mounted onto a rigid arm 37 via a reinforcing plate 41 by means of a connection means 42 which may be formed by a suitable method such as welding, thus completing the assembly of the transducer suspension mount apparatus. The above flexure 36 comprises a gimbal portion 36c which supports the transducer, and gimbal supporting portions 36a and 36b, and has a flexible structure that does not restrict the pitching and rolling movements of the transducer 35. The spring member 33 having the elastic spring portion 32 is formed integrally with the flexure 36, and the main function of this spring member 33 is to transmit to the transducer 35 a certain load which is applied by a load arm 39 formed by the spring portion 33 and the pressurizing plate 34 connected to the portion 33 by means of a connecting means 38 which may be welded. The magnetic head/arm assembly 31 has a mounting portion 40 at which the assembly 31 and the reinforcing plate 41 are fixed by means of a connection means 42 which may be welded. The feature of this embodiment of the invention is, similarly to the first and second embodiments, the provision of further connecting points 43 comprising welded portions in the vicinity of both ends of the borderline 44, that is, the root ends of the load arm 39. By virtue of providing such connecting points as an additional connection means, it is possible to reduce the level of vibration of the load arm 39, thereby accomplishing a transducer suspension mount apparatus with reduced vibration of the transducer, in the same way as in the foregoing embodiments.

The structure in accordance with the invention in which the root ends of the magnetic head/arm assembly are firmly fixed to the rigid arm may be applied to a transducer suspension mount apparatus having a configuration other than those described in the foregoing embodiments. In addition, although in the foregoing embodiments, the method employed in forming the connecting points 13 is spot welding, this is not limitative. Alternatively, the connecting points may be formed by any other means of, for instance, a binder, rivets, or, clamps, provided that it can firmly connect the magnetic head/arm assembly 16 to the rigid arm 7.

We claim:

1. A transducer suspension mount apparatus comprising:
   a magnetic head/arm assembly which supports a transducer; and
   a rigid arm which supports said magnetic head/arm assembly in a cantilevered manner;
   said magnetic head/arm assembly having a mounting portion fixed to said rigid arm and including connecting points at which said magnetic head/arm assembly and said rigid arm are connected to each other, and an elastic spring portion disposed on a side of said magnetic head/arm assembly closer to said rigid arm than to said transducer, said mounting portion of said magnetic head/arm assembly overlapping part of said rigid arm;
   at least each of predetermined ones of said connecting points proximate to said elastic spring portion having a point at an outer periphery thereof disposed with respect to a first borderline at which said magnetic head/arm assembly extends beyond said rigid arm and to a second intersecting borderline at which said mounting portion of said magnetic head/arm assembly proximate to said elastic spring portion overlaps said rigid arm so as to delimit closest distances extending in different directions between said outer periphery point and said first and second borderlines indicated by the symbols lx and ly, respectively, each of said predetermined ones of said connecting points being provided within a region in which the closest distances lx and ly are not greater than predetermined dimensional values, respectively, and within which region the rigidity of each of said predetermined ones of said connecting points varies at a constant rate with respect to the associated first and second borderlines and the distances lx and ly therebetween.

2. A transducer suspension mount apparatus according to claim 1, wherein said predetermined ones of said connecting points comprise welded connections.

3. A transducer suspension mount apparatus according to claim 2, wherein said welded connections include spot welded connections.

4. A transducer suspension mount apparatus according to claim 1, wherein said predetermined ones of said connecting points comprise binding means for connecting said magnetic head/arm assembly and said rigid arm to each other.

5. A transducer suspension mount apparatus according to claim 1, further comprising reinforcing plate means for connecting said magnetic head/arm assembly and said rigid arm to each other.

6. A transducer suspension mount apparatus according to claim 1, wherein said mounting portion of said magnetic head/arm assembly contacts said rigid arm.

7. A transducer suspension mount apparatus according to claim 1, wherein said mount portion of said magnetic head/arm assembly is part of a transducer supporting arm for supporting said transducer, a tip of said transducer supporting arm opposite to said mounting portion having flexure means mounted thereon for supporting said transducer.

8. A transducer suspension mount apparatus according to claim 7, wherein said predetermined ones of said connecting points comprise welded connections.

9. A transducer suspension mount apparatus according to claim 7, wherein said welded connections include spot welded connections.

10. A transducer suspension mount apparatus according to claim 7, wherein said predetermined ones of said connecting points comprise binding means for connecting said magnetic head/arm assembly and said rigid arm to each other.

11. A transducer suspension mount apparatus according to claim 7, further comprising reinforcing plate means for connecting said magnetic head/arm assembly and said rigid arm to each other.

12. A transducer suspension mount apparatus according to claim 7, wherein said mounting portion of said magnetic head/arm assembly contacts said rigid arm.

13. A transducer suspension mount apparatus according to claim 1, wherein the closes distances lx and ly are not greater than 0.6 mm, respectively.

14. A transducer suspension mount apparatus according to claim 13, wherein said predetermined ones of said connecting points comprise welded connections.

15. A transducer suspension mount apparatus according to claim 13, wherein said welded connections include spot welded connections.

16. A transducer suspension mount apparatus according to claim 13, wherein said connection points comprise binding means for connecting said magnetic head/arm assembly and said rigid arm to each other.

17. A transducer suspension mount apparatus according to claim 13, further comprising reinforcing plate means for connecting said magnetic head/arm assembly and said rigid arm to each other.

18. A transducer suspension mount apparatus according to claim 13, wherein said mounting portion of said magnetic head/arm assembly contacts said rigid arm.

* * * * *